United States Patent [19]
Hasslinger et al.

[11] 3,764,775
[45] Oct. 9, 1973

[54] ERROR COMPENSATION IN TOOL MOVEMENT OVER INTERMITTENTLY ADVANCED WORK SUPPORT SURFACE

[75] Inventors: Robert L. Hasslinger, Simi; William J. Newton, Lakewood; Esteban J. Toscano, Oceanside; Rodolfo Castro, San Juan Capistrano, all of Calif.

[73] Assignee: Hughes Aircraft Company, Culver City, Calif.

[22] Filed: Jan. 19, 1972

[21] Appl. No.: 218,933

[52] U.S. Cl. ............... 219/121 L, 83/208, 83/216, 83/217, 235/151.11, 340/172.5
[51] Int. Cl. ............................................. B23k 27/00
[58] Field of Search ............... 219/121 L, 121 EB; 444/1; 340/172.5; 235/151.11; 83/208, 216, 217; 226/32, 36, 115

[56]  References Cited
UNITED STATES PATENTS

| | | | |
|---|---|---|---|
| 3,633,011 | 1/1972 | Bederman | 340/172.5 |
| 3,353,161 | 11/1967 | Toscano | 340/172.5 |
| 3,322,961 | 5/1967 | Harrison et al. | 226/33 |
| 3,614,369 | 10/1971 | Medley | 83/925 CC |
| 3,548,699 | 8/1969 | Gerber | 83/925 CC |
| 3,369,101 | 2/1968 | Di Curcio | 219/121 L |
| 3,422,246 | 1/1969 | Wetzel | 219/121 L |

*Primary Examiner*—R. F. Staubly
*Assistant Examiner*—George A. Montanye
*Attorney*—W. H. MacAllister

[57] ABSTRACT

In a laser cutter, cloth to be cut is advanced to enter the cutting area by means of a conveyor. The conveyor is advanced in steps, stopping before each cutting operation. Deviations of the actual stopping positions of the conveyor from its nominal stopping positions are compensated for by appropriately modifying the cutting path followed by the laser beam.

4 Claims, 11 Drawing Figures

PATENTED OCT 9 1973
3,764,775
SHEET 1 OF 4
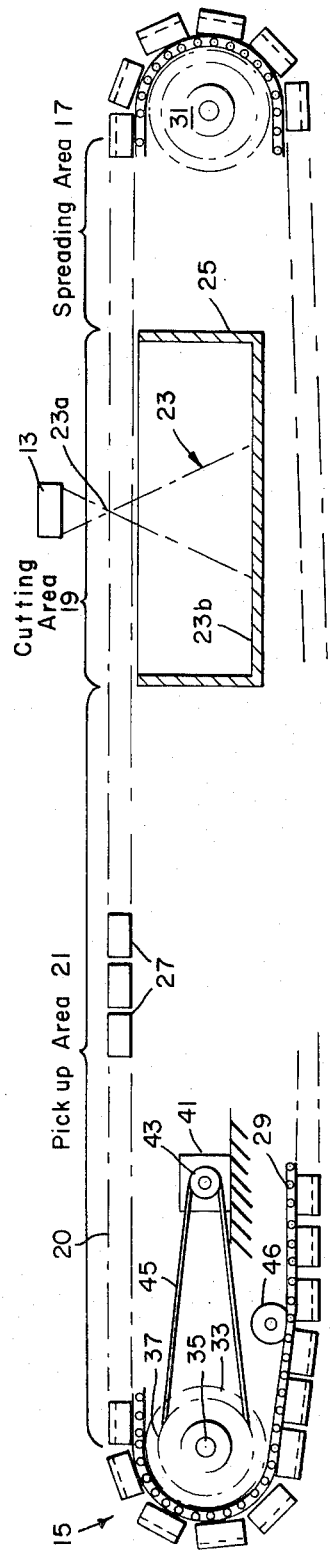

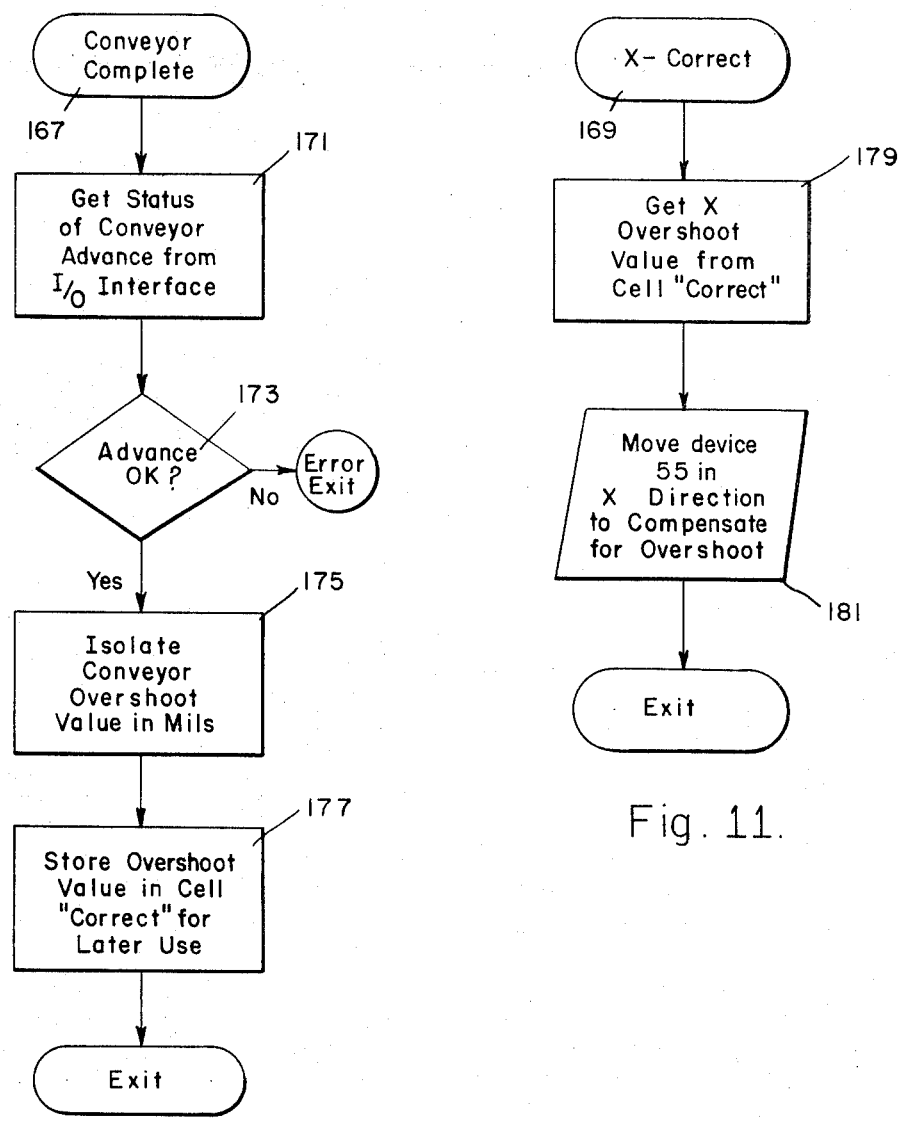
Fig. 10.
Fig. 11.
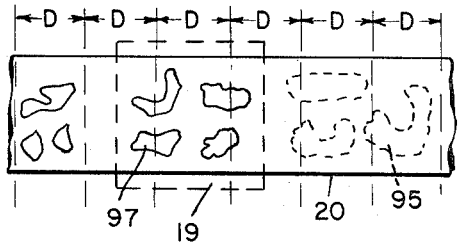
Fig. 5.

ERROR COMPENSATION IN TOOL MOVEMENT OVER INTERMITTENTLY ADVANCED WORK SUPPORT SURFACE

The present invention relates in general to apparatus wherein a laser beam is guided along a route on a surface of a material in order to effect a cut along that route. More particularly, the invention is directed to a system for advancing the material which is to be cut and to effect an accurate relationship between the route along which the beam is guided and the means by which the material is positioned.

Although discussed herein in order to illustrate the preferred use of the present invention, the overall laser cutter system is not the invention of applicants and is not claimed herein. Instead, it is the invention of others by whom it was disclosed to applicants and by whom an application will be filed thereon, and assigned to the assignee of the present invention.

In answer to a long existing need for increased automation in the garment industry, a new concept for cutting cloth was introduced at Hughes Aircraft Company, assignee of the present invention. In accordance with this concept, cloth and other material, such as leather for example, is cut into patterns by a travelling laser beam. Basically, the material to be cut is spread in a single layer onto a support surface which is movable into and out of a cutting area within which a laser beam is made to travel through a selected route over the material. The laser beam is focused at the level of the material and cuts through it cleanly by vaporizing the material in a narrow path therethrough. The support surface for moving the material into the cutting area may assume various forms. For example, it may comprise one or more carriages upon which material is distributed and which are then successively rolled into the cutting area. Alternatively, the cloth to be cut may be fed from a bolt onto a conveyor belt which is periodically advanced through equal increments so as to bring successive portions of the cloth into the cutting area. In this type of cutting system the laser beam is inherently more capable of being precisely positioned than is the conveyor, because of the greater mass of the latter.

One possible approach to the requirement that the cutting route of the laser beam be accurately related to the successive working positions of the conveyor belt would be to precisely position both the laser beam's path and the successive working positions of the conveyor. The alternative whereby only the laser beam would be precisely positioned would clearly be preferable. Accordingly, it is a principal object of the present invention to position a cutting tool such as a laser beam accurately with respect to a work support surface such as a conveyor which is being advanced through successive work positions along a given axis, although the work support surface itself is not positioned accurately at those work positions.

Another object of the present invention is to permit a work support surface to be advanced to successive work positions without the need to position it accurately at each such position. It is the further object of the present invention deliberately to cause a conveyor to overshoot each of its successive work positions by a known amount so that a compensating correction, which is always in the same direction, may be applied to an associated cutting tool and to do so without allowing the position errors of the work support surface to accumulate.

These and other objects of the invention are achieved by a positioning system wherein a movable work support surface is advanced along a given axis toward a predetermined work position and is stopped at an actual position which is near that work position. The distance from the work position to the actual position of the work support surface is measured and the position of the cutting device along the axis is changed so as to compensate for the difference between the actual and predetermined work positions.

In accordance with a more detailed aspect of the invention, a positioning system is provided for accurately locating a tool relative to a work support surface which is intermittently advanced along a given axis to, and stopped at, equally spaced work positions. Means are provided for traversing the tool after each advancement of the work support surface through successive points which are predetermined relative to a stationary reference point. The work support surface is advanced along the aforementioned axis substantially, but not precisely, to respective ones of the successive work positions. The means for thus advancing the work support surface includes means for digitally signalling its actual work positions, with further means being provided, operating in response to the digital signalling means for offsetting the predetermined points of the tool for each advancement of the work support surface by an amount which equals the difference between the actual and the predetermined work positions of the work support surface.

Another feature of the present invention is that by using a binary counter for signalling the position of the work support surface, the small errors which tend to occur after each advancement are prevented from accumulating. Error accumulation is avoided by resetting and restarting the counter every time the work support surface has traversed a distance corresponding to the spacing between successive ones of its predetermined work positions.

Another useful feature of the invention is the provision of means to insure that each time the movable work support surface is advanced, it will overshoot its predetermined work position, thereby permitting the correction made to the cutting tool to be always in the same direction as that in which the conveyor is being advanced.

The invention will be described in greater detail by reference to the drawings in which:

FIG. 1 is a side elevation, partly schematic, of a laser beam cutting system having a cutter positioned relative to a conveyor in accordance with the present invention;

FIG. 2 is a perspective view of an exemplary mechanism for traversing the laser cutting beam relative to the conveyor;

FIG. 3 is a perspective view, partially cut away, of an optical element used in the system illustrated in FIG. 2, for focusing and changing the direction of the laser cutting beam;

FIG. 4 is a simplified block diagram of the positioning system of the present invention;

FIG. 5 illustrates the manner in which material on the conveyor shown in FIGS. 1 and 4 is advanced into a working area for cutting;

Figure 7:
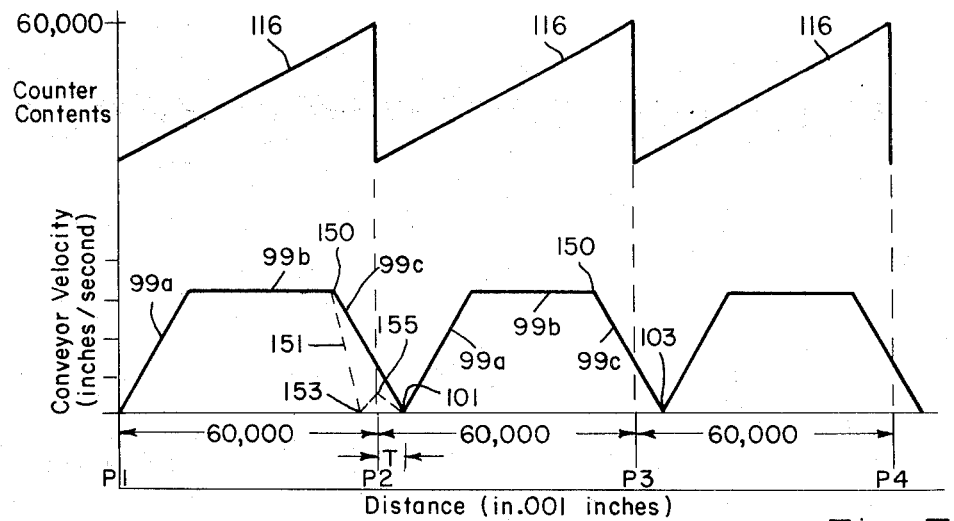
Figure 8:
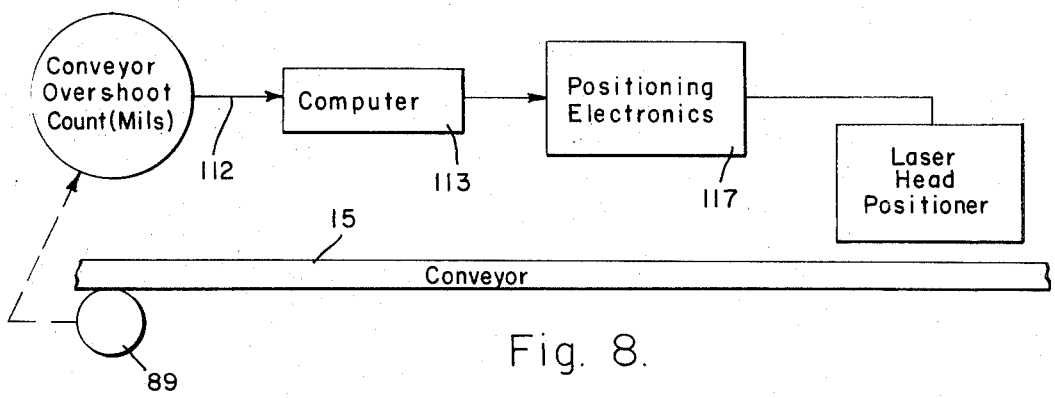
Figure 9:
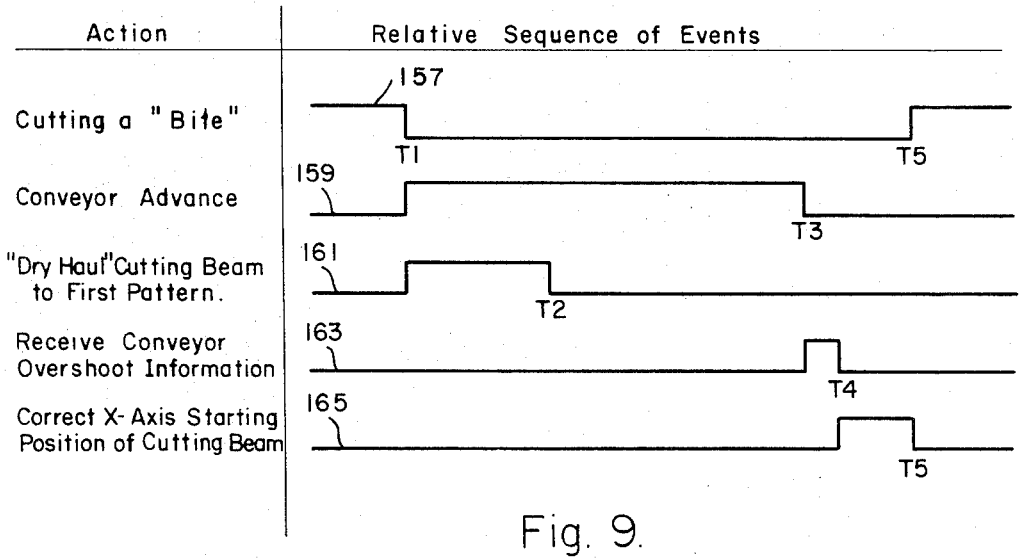

FIG. 7 contains two graphs illustrating the manner in which the conveyor is advanced in accordance with the present invention and the manner in which the digital counter providing for signalling conveyor movements is recycled;

FIG. 8 is a block diagram of the system, included principally to help explain the function of the computer in implementing the corrections made to the position of the cutting tool to compensate for positioning errors of the conveyor;

FIG. 9 is a timing diagram illustrating the error correcting operation and its time relationship with the other operations of the system of FIG. 8;

FIGS. 10 and 11 are flow charts illustrating the subroutines performed by the computer to make the corrections to the cutter position in order to compensate for position errors of the conveyor.

Referring now to the figures, a laser cloth cutting system 11 incorporating features of the present invention is illustrated in FIG. 1. It is comprised principally of a focused laser beam source 13 disposed upon a conveyor assembly 15. Moving counterclockwise, the conveyor system 15 serves to receive cloth to be cut upon a spreading area 17 from which the conveyor carries the cloth into a cutting zone 19 over which the focused laser beam source 13 is moved along a predetermined path. During the cutting operation the conveyor 15 is stationary, and following the cutting operation the system moves sufficiently to bring a new supply of material to be cut from the spreading area 17 into the cutting zone 19 and to move the previously cut material from the cutting zone 19 to a pickup area 21 from which the cut material is removed.

As best seen in FIG. 1, the beam 23 which is directed at the material in the cutting zone 19 is focused so as to have its minimum cross section or waist 23a at the work support surface 20 presented by the conveyor 15. Below the work support surface 20 the beam diverges, and after passing through the conveyor 15 it is stopped by a plate 25 appropriately coated to dissipate the energy of the beam without causing the plate to overheat.

The conveyor 15 is principally comprised of a plurality of elongated rectangular slats 27 connected at their ends into an endless belt by means of a pair of chains 29. The chains are supported upon sprockets 31 and 33, the latter being mounted on a drive shaft 35 driven by a motor 39 (FIG. 4) through a drive train which includes a speed reducer 41 and a pair of sprockets 43 and 37 interconnected by chain 45 and respectively mounted on the output shaft of the speed reducer 41 and upon the drive shaft 35. Each of the chains 29 is desirably provided with a tension adjusting vertically movable sprocket 46.

A suitable arrangement for traversing a laser cutting beam over the cutting area 19 of the system is illustrated in FIG. 2. Built on a frame 67, it includes a stationary laser source 47 extending along one side of the frame and generating the laser beam 23. A pair of optical devices (not shown) mounted at the rear end of the frame at opposite corners serve to change the direction of the laser beam 23 by 90° twice, causing it to approach the first of a pair of traveling optical assemblies 49 and 51, generally parallel to the right edge of the frame.

The traveling optical assemblies 49 and 51 are translated relative to the support surface 20 and material lying thereon by a transport 53 driven along the X direction by an electric drive motor 55 through a lead screw 57 which is operatively coupled to a transverse rail 59 through a drive nut 61. A pair of sleeve bearings 63 support the rail 59 slidably upon a pair of longitudinal guide rails 65 which extend along opposite sides of the frame 67 in the X direction. The first optical device 49 is attached directly to one of the sleeve bearings 63 and is located in line with the incoming laser beam 23. Consequently, by forward or reverse rotation of the motor 55 the first optical device 49 may be caused to move along the X direction either toward or away from the rear of the frame 67. In order to keep the optical device 49 in the path of the laser beam, the guide rail 65 is located exactly parallel thereto.

The movement of the second optical device 51 in unison with the first optical device 49 is effected by mounting it upon the rail 59. However, in order to permit the second optical device 51 also to move along the Y direction relative to the first optical device 49 this mounting is made by means of a bracket 69 having a sleeve bearing 71 at one end riding slidably upon the transverse guide rail 59. A drive nut 73 carried on the bracket 69 is driven by a second drive motor 75 through a lead screw 77 extending underneath and parallel to the transverse guide rail 59. Thus, the second optical device 51 may be moved relative to the first optical device 49 by forward or reverse operation of the motor 75. Since it is necessary that the second optical device 51 remain in the path of the laser beam 23 emanating from the first optical device 49 the transverse guide rail 59 and the lead screw 77 thereunder both extend parallel to that beam path portion.

As shown by the illustrated path of the laser beam 23, it is turned 90° by means of the first optical assembly 49, causing it to travel across the support surface 20 and is again turned 90° toward the support surface by the second optical assembly 51.

FIG. 3 illustrates the second optical assembly 51 in greater detail. In particular, after leaving the first optical assembly 49, the laser beam 23 enters the second optical assembly 51 through an inlet window 79 in a casing 81 which is shown with one of its walls removed. The incoming laser beam 23 first strikes a concave focusing mirror 83 located at the back of the casing opposite the inlet opening 79 from which it is then reflected onto a second plane mirror 85 at the same end of the casing as the opening 79 and to one side thereof. The plane mirror 85 is inclined relative to the floor of the casing 81 (which may for purposes of discussion be assumed to be horizontal), the angle of inclination being such as to reflect the focused beam 23 down and out through an exit opening 87.

Figure 6:
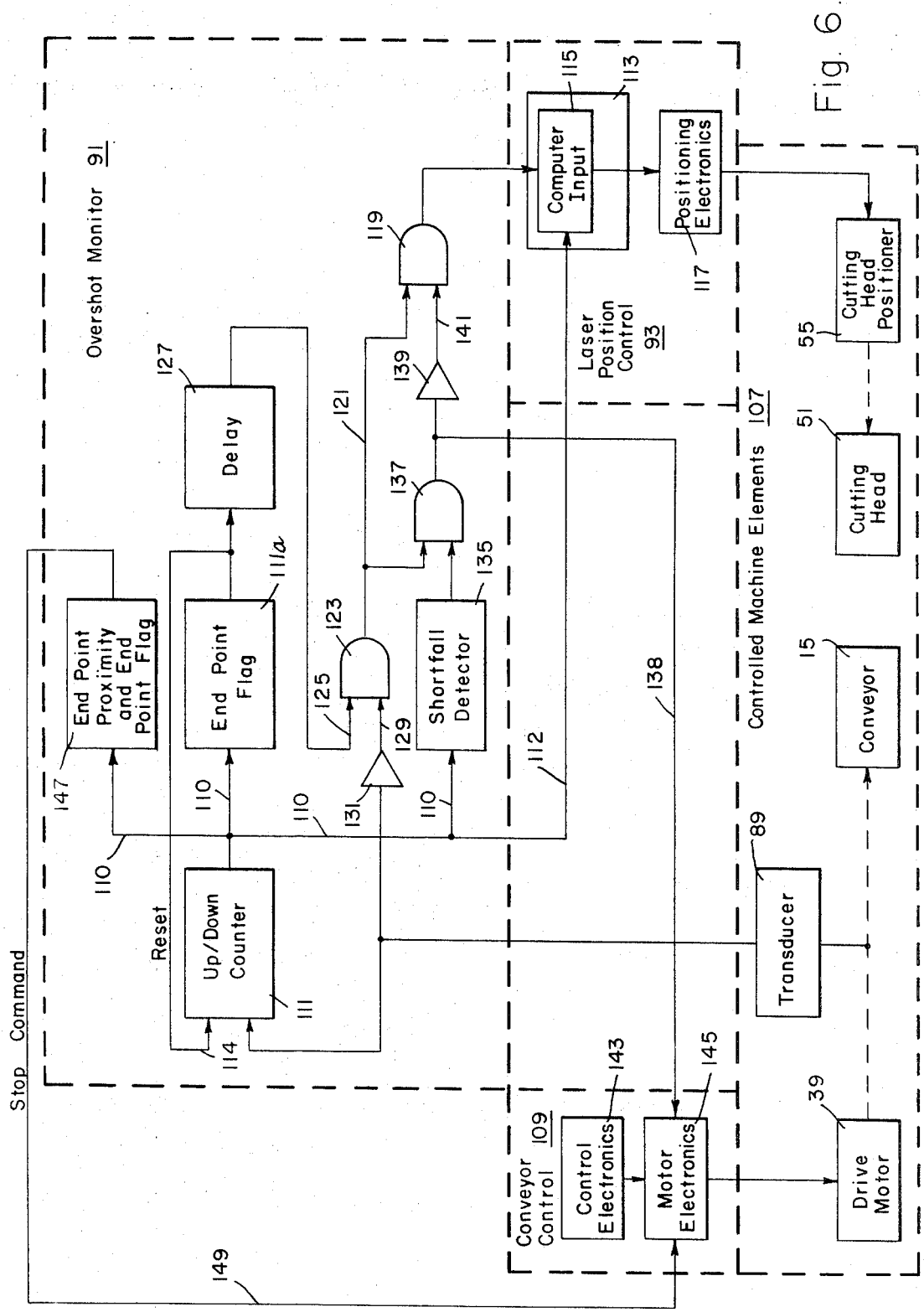
FIG. 6 is a detailed block diagram of the system of the present invention.

The broad concept of the present invention may be grasped by referring to FIGS. 4, 5 and 6. The basic elements of system are illustrated in FIG. 4 and are seen to include a transducer 89 coupled through the drive shaft 35 of the motor 39 to the conveyor 15 to generate signals representing the position of the latter. Signals from the transducer 89 are fed to an overshoot monitor 91 which is operative to stop the conveyor substantially at successive ones of a series of predetermined work positions and also to detect the amount by which the conveyor work support surface 20 has missed each such position. Thus, as seen in FIG. 5, the work support, or conveyor, surface 20 is moved through the cutting area 19 of the laser cutter system in equal steps, labelled D. The material which is to be cut is carried upon the work support surface into the cutting area 19 where it is cut after the work support surface has been brought to a stop. The predetermined patterns which are to be cut in the material are shown by the dashed lines 95 to the right of the cutting area and the actually cut patterns in the material are shown by the solid outlines 97. Patterns cut during successive steps of the conveyor may interlace. For this reason it is important that the cutting tool should be accurately positioned relative to the work support surface after each advance in order to prevent pattern overlap.

Signals from the overshoot monitor 91, representing the amount by which the actual resting position of the conveyor differs from its predetermined work position are applied to the laser position control 93 whose principal function is to traverse the laser cutting beam over the cutting area 19 through a predetermined series of points. The positioning error of the conveyor is compensated for in the laser position control 93 by displacing the actual position traversed by the laser beam in the cutting area 19 in the X direction by the amount of the conveyor positioning error.

The preferred method of operating the system of FIG. 4 is illustrated by the bottom chart in FIG. 7 wherein conveyor velocity is plotted against distance travelled. The horizontal axis of the graph is divided into a series of equal segments, their ends being the poins P1, P2, P3 and P4. These points represent the predetermined work positions near which the conveyor is stopped. In the exemplary embodiment of the invention which will be discussed herein in detail it may be assumed that the points P1–P4 etc., are spaced exactly five feet or 60,000 thousandths of an inch apart. When the conveyor is started, it will accelerate at a rate predetermined as shown by the graph segment 99a, until it reaches a constant velocity, indicated by the horizontal graph segment 99b. At a time calculated to result in the conveyor moving the desired distance, the motor which drives the conveyor is de-energized and the conveyor moves at a diminishing speed represented by the graph segment 99c to a stop. In keeping with a preferred implementation of the invention, the instant when the drive motor is de-energized is selected to result in the conveyor coming to a stop which is past the predetermined working position P2. Then, in accordance with the invention, an appropriate correction is made to the cutting tool to compensate for the overshoot, that is, the distance between the predetermined working position P2 and the actual stopping point 101 of the conveyor. With the appropriate correction executed, the cutting operation is carried out, after which the conveyor is restarted from its last stopping position 101, moving successively at the velocities 99a, 99b and 99c and being brought to a second actual work position 103 which again by design is past the second predetermined work position P3. A correction is again made to the position of the cutting tool and the same sequence is repeated for every subsequent advancement of the conveyor.

The position control system of FIG. 4 is illustrated in greater detail in FIG. 6 wherein the system is shown organized into four blocks. The first block 107, labeled "Controlled Machine Elements" includes the conveyor 15, its drive motor 39, and the transducer 89 for indicating the conveyor position. The block also includes the laser beam positioning assembly 51 and the cutting head positioning motor 55. The second principal block 109 of the system labeled "Conveyor Control" includes conventional electronic components, to be discussed subsequently, for controlling the operation of the drive motor 39. The system is completed by the Overshoot Monitor and Laser Position Control blocks 91 and 93 whose functions were described with reference to FIG. 4.

The position of the conveyor 15 is signalled at all times by an up-down counter 111 which receives pulses produced by the transducer 89. A suitable pulse rate for the transducer 89 is one pulse for each 1,000 th of an inch movement. The updown counter 111 need not be described in detail since such devices are commercially avaiable as integrated circuits. Typically they are comprised of a series of four bit binary counters which are cascaded to produce any desired count capacity. Thus, at the output of the counter 111 there will appear on a plurality of lines in binary form the instantaneous position of the conveyor relative to its last predetermined work position. The ability of the counter 111 to count down as well as up permits it to follow the conveyor 15, should it be inadvertently moved backward either through backlash of its mechanical drive components or by an operator coming in contact therewith.

In accordance with a feature of the invention means are provided to reset the counter 111 whenever it has received a number of pulses corresponding to movement of the conveyor 15 exactly through the distance between successive ones of its predetermined work positions. Thus, with the assumed inner-position spacing of exactly five feet (60,000 thousandths of an inch) the counter 111 is reset every time its count state reaches 600,000. This is accomplished by means of an end point flag 111a which will typically be a set of logic gates connected to the output lines 110 of the counter and interconnected so as to produce an output when the count state signalled on the counter output lines 110 reaches 60,000. This signal is then applied over a reset line 114 to the counter 111 which has an input operative to reset the counter to zero when so energized.

In FIG. 7 the relationship between the count state of the counter 111 and the position of the conveyor 15, and in particular the work support surface 20 presented thereby, is illustrated as a series of ramps 116. Each ramp represents a gradual increment in count state from 0 to 60,000 which corresponds to the advancement of the conveyor from a given one of its predetermined work positions to the next such position. It is also seen that the count state is changed from 60,000 to 0 each time that the conveyor passes through one of its predetermined work positions P1–P4. The above counter arrangement has several advantages. First and foremost, the cumulation of positioning errors, which might occur in the counter were it not reset, is eliminated. Thus, even though the conveyor is permitted to come to rest at positions 101 and 103 rather than at the predetermined work positions P2 and P3, this error is not permitted to enter the counter 111. Instead it is always reset at the moment when the conveyor crosses its predetermined work positions so that when the conveyor comes to rest, the position signalled by the counter 111 will always be the actual difference between the last predetermined work position for the conveyor and the position where the conveyor actually came to rest.

A second advantage of the illustrated arrangement is that by resetting the counter when the conveyor goes through its predetermined work position, that position is automatically subtracted from the ultimate output of the counter so that, when the conveyor comes to rest the counter, having counted up from zero at the instant when the conveyor crossed the predetermined work position, will produce at its output the net difference between actual and predetermined work positions.

A third advantage of using an up-down counter in the manner shown in FIG. 6 is that slight discrepancies between the movement of the conveyor 15 and the count produced by the counter 111 can be compensated by changing the response point of the end point flag 113. Thus, the conveyor chains 29 (FIG. 1) may stretch slightly so that, whereas initially the conveyor had advanced precisely five feet for a 60,000 count produced by the transducer 89, after continued use the conveyor may move slightly more or less than that amount for the same count. This discrepancy can be readily compensated by making the end point flag 111a respond to whatever number of pulses are generated by the transducer 89 for the desired nominal travel of the conveyor. Thus, for example, if it is detected that 59,500 pulses are being produced by the transducer 89 for a predetermined five foot movement of the conveyor 15, the end point flag 111a will be adjusted to trip, that is to produce a pulse, after the counter 111 has reached a count state of 59,500. The resulting error will be noncumulative, with the counter 111 being recycled beginning with each instance when the conveyor passes a successive one of its series of predetermined work positions.

Changing of the tripping point of the end point flag 111a may be accomplished by changing the connection between the logic gates which comprise that circuit and, if desired, this can be in turn accomplished by switches operated through dials on an instrument panel marked with the various number combinations that can be selected for the tripping point of the end point flag.

In keeping with the invention, the conveyor position error which appears at the output of the counter 111 is applied over line 112 to the laser position control 93 which includes a computer 113 having an input 115 and a positioning electronics block 117. A computer 113 may for example be a Hewlett-Packard Model 2116. The positioning electronics 117 can take any of several forms such as for example a numerical control unit which is adapted to convert the numerical data produced by the computer 113 into a series of commands for the laser head positioner 55. Thus, in effect the positioning electronics 117 is an interface between the computer 113 and the laser head positioner 55 which in FIG. 2 is shown as an electric motor, with the interface 117 serving to convert the positioning data from the format in which it is produced by the computer 113 to the format necessary to drive the laser head positioner 55. The particular form which the positioning electronics 117 takes is unimportant to the present invention and will therefore not be described further.

With respect to the counter 111 it should be noted that while its error output is shown in FIG. 6 as being applied to the computer input 115 on a single line 112, it is actually carried as a combination of digital signals on several lines, their number being determined by the magnitude of the error number anticipated. Thus, for the exemplary system illustrated herein, if the maximum conveyor position error that the system is required to handle is about one-half of an inch, the maximum number which the lines represented by the line 112 are required to carry is about 500. This can be handled by nine lines. Therefore, assuming a one-half inch maximum positioning error, the connection 112 between the counter 111 and the computer input 115 represents nine lines for the embodiment illustrated in FIG. 6. On the other hand the line 110 which must carry the output of the counter 111 to the end point flag 111a up to a count of 60,000 necessarily represents at least 16 lines.

The error signal carried from the counter 111 over the lines 112 to the computer input 115 are to be applied thereto only if certain conditions are met. First, the conveyor 15 must have stopped, since it is only then that the position of the conveyor is of interest. Secondly the counter 111 must not be receiving a pulse from the transducer 89 at the instant when the position error is being applied. Were this otherwise, an incorrect error number would be read into the computer. Thirdly, in keeping with a particular feature of the invention, the position error of the conveyor is to be ignored if the conveyor has not gone past its predetermined work position. In other words, if the conveyor 15 falls short of its predetermined work position, it will be restarted rather than to apply a backward correction to the laser head 51.

To insure that the above three conditions are met, the computer input 115 is made conditionally operable to receive the output of the counter 111, the operation being made dependent upon the presence of an enabling (logic 1) signal on the output of an AND gate 119 in the overshoot monitor 91. In turn the AND gate 119 has its two inputs enabled concurrently only if the above three conditions are present. More particularly, the first input 121 of the AND gate 119 is enabled only if the first two of the above three conditions are met. Thus, it receives the output of a second AND gate 123 in the overshoot monitor 91 whose two inputs 125 and 129 are respectively enabled when the first and the second of the above three conditions are present. The AND gate input 125 in turn receives the output of the end point flag 111a through a delay 127, with the delay being designed to apply an enabling input to the AND gate 123 a predetermined time after the end point flag 113 has been tripped. This delay is designed to correspond to the time known to be required by the conveyor 15 to coast to a stop after the conveyor has crossed its predetermined work position. From FIG. 7 it may be seen that the conveyor motor 39 will have been turned off and the conveyor will have begun to decelerate well before the time that the conveyor crosses its predetermined work position, such as the point P2. By the time the conveyor crosses that position it will have slowed down considerably from its maximum speed, represented by the graph portion 99c. Thus, only a relatively short time will remain before the conveyor comes to a full stop at the point 101. A typical time period for this interval, shown as T in FIG. 7 is approximately one second and this will be approximately the time delay introduced by the delay 127.

Applied to the second input 129 of the AND gate 123 are the output pulses from the transducer 89 through an inverter 131 so that only in the absence of a pulse from the transducer 89 is there an enabling input to the input 129 of the AND gate. Thus it follows that an enabling input appears at the output of the AND gate 123 and at the input 121 of the AND gate 119 only after the conveyor 45 has come to a full stop and only if there are no pulses being applied for any other reason to the counter 111.

In order to insure that the conveyor 15 has come to a stop past its predetermined work position, a shortfall detector 135 is provided. Basically, the purpose of the shortfall detector 135 is to monitor the output of the counter 111 and to provide one type of signal as the contents of the counter are approaching 60,000 (or whatever count has been selected to correspond to the predetermined work position of the conveyor) and to produce a second type of signal as soon as that count state has been surpassed. Thus, by proper selection of a set of logic gates similar to those comprising the end point flag 111a the shortfall detector 135 can be made to produce disabling (logical 0) signal level beginning with a count of 50,000 in the counter 111 and to maintain that output signal level until the counter 111 reaches the 60,000 count state, at which point the output of the detector 135 switches to an enabling signal level. The output of the detector 135 is applied through an AND gate 137 and through an inverter 139 to the input 141 of the AND gate 119. Consequently, so long as the enabling signal level is produced by the detector 135, indicating that the conveyor 15 has not reached its predetermined work position, a disabling signal will be applied to the AND gate input 141 by virtue of the inverter 139, so that a disabling signal level will be applied to the computer input 115 by the AND gate 119. Conversely as soon as the conveyor 15 has reached and passed its predetermined work position, the shortfall detector 135 will drop its outut to a disabling level. This will be changed by the inverter 139 to appear as an enabling signal level at the input 141 of the AND gate 119, permitting the output of the up-down counter 111 to be applied to the computer input 115, provided that the presence of the other two necessary conditions is being concurrently signalled at the input 121 of the AND gate 119.

It will have been noted that the output of the shortfall detector 135 is applied to the inverter 139 through an AND gate 137 whose second input is enabled by the output of the AND gate 123. The reason for thus routing the output of the shortfall detector 135 is to produce at the output of the AND gate 137 a restart signal if and only if the position of the conveyor 15 when it has come to rest (as signalled by an output from the AND gate 123) is short of its predetermined work position. When this happens, the signal which appears at the output of the AND gate 137 is applied as a restart signal to the conveyor control 109, which includes conventional control electronics 143 and similarly conventional motor electronics 145. The control electronics normally includes at least a starting switch which when closed causes the motor electronics 145 to start the drive motor 39. The motor electronics 145 serves to apply the necessary drive current to the drive motor 39 and may be a commercially available model such as the General Electric GP100 SCR drive. The motor electronics 145 will advantageously be set so that after an initial period of acceleration represented by the initial sloped segment 99a of the graph 99 in FIG. 7 the motor continues at a constant speed, advancing the conveyor at about 16 to 18 inches per second or whatever other speed is selected. Subsequently, when the drive motor 39 is cut off, again by the motor electronics 145, that circuit will control the drive motor 39 so as to cause it to decelerate from its level speed to its final rest condition at a predetermined rate as represented by the second sloped portion 99c in FIG. 7.

Control over deceleration is usually effected by short-circuiting the motor armature (possibly through a limiting resistor) so as to induce braking currents therein by generator action of the motor.

Stopping of the conveyor 15 a short distance past its predetermined work position such as the point P2 in FIG. 7 for example is brought about by means of an End Point Proximity and End Point Flag Circuit 147. The function of the circuit 147 is primarily to monitor the output of the up-down counter 111 and to produce a signal when that output, as it appears on line 110, reaches a number which corresponds to a position of the conveyor 15 referred to as the "proximity point." Proximity point may be defined as that position from which the conveyor will slow to a stop slightly past its predetermined work position (such as P2) if the motor 39 is cut off when the conveyor has reached that proximity point. Assume that for example the inertia of the conveyor 15 and the design characteristics of the motor electronics 145 are such that after a stop signal has been applied to the motor electronics 145, the conveyor will travel three more inches (or 3,000 mils). Assume further that it is desired to cause the conveyor to actually overshoot its predetermined work position P2 by exactly 0.348 inches. With these design criteria the circuit 147 will have its logic gates selected so as to produce a stop command signal when it has detected the accumulation of 57,348 pulses in the counter 111. At this instant the stop command signal from the circuit board 47 will be applied over a line 149 to the motor electronics 145, commanding the circuit to initiate the deceleration phase of the drive motor 39. The proximity point at which this occurs is shown by the point 150 in FIG. 7, where the horizontal portion 99b of the graph 99 ends and the downwardly sloping portion 99c begins. Deceleration of the conveyor as controlled by the motor electronics 145 continues until it comes to a stop at the point 101.

Next assume that for some reason the conveyor did not advance far enough after it began to decelerate at point 150 and that, rather than to decelerate along the slope 99c as it should have, it instead decelerated at a faster rate along the dashed slope 151, stopping at a point 153 short of the predetermined work position P2 for the conveyor. This condition will be detected by the shortfall detector 135 in the manner explained previously and a restart signal will be applied over the line 138 to the motor electronics 145, causing the drive motor 39 to be restarted. To stop the conveyor at approximately the proper working position 101, the circuit 147 includes a second set of logic gates which serve to detect the instant when the up-down counter 111 has counted up to 60,000, or in other words when the conveyor has reached its predetermined work position P2. At this time a second stop command signal is produced by the circuit 147 and applied over the line 149 to the motor electronics 145. This is indicated by the point 155 in FIG. 7 representing the end of the second dashed line along which the conveyor has accelerated upon having been restarted from its premature stop at the point 153. Beginning with the point 155 the conveyor 15 is again decelerated by the motor electronics 145 in response to the stop command from the circuit 147 and comes to a halt at the proper position 101.

With respect to the "End Point Proximity and End Point Flag Circuit" 147 it will be understood that the numbers which have been selected therefor are arbitrary and depend upon the design of the conveyor system and upon the design of the motor electronics 145. Thus, for example, the point at which the motor electronics 145 signalled to decelerate the drive motor 39 after it has been restarted from the point 153 need not be the same point P2 which is the predetermined work position for the conveyor. That simply happens to be a suitable point at which to begin the deceleration of the motor after it has been restarted. It should also be understood that the entire restart sequence is an optional feature of the invention, serving to permit all corrections to the laser head 51 to be in the same direction. However, if it is acceptable to make corrections to the cutting head 51 in both the forward and the reverse directions along the axis of movement of the conveyor, the restart feature described hereinabove may be dispensed with.

Summarizing the preceding description, by virtue of the control functions performed by the overshoot monitor 91 in conjunction with the conveyor control 109 and the controlled machine elements 107, the work support surface 20 of the conveyor assembly 15 is periodically advanced over a preselected distance, illustrated as 5 feet, and each time it is brought to rest at an actual work position which is slightly beyond a corresponding predetermined work position of the conveyor. If upon initially stopping, the work support surface does not travel far enough so as to go beyond the predetermined work position, it is restarted and caused to move a slight additional amount until it reaches such a position. Each time that the work support surface 20 has come to rest at an actual work position which is slightly beyond its predetermined work position, the amount of overshoot is signalled on a set of lines 112 in binary form, representing the position error of the work support surface. The manner in which this position error is applied so as to make a compensating change in the position of the laser head 51 will be explained next.

It will be helpful first to refer to a functiona block diagram of the system as shown in FIG. 8 and to a timing diagram for that system as shown in FIG. 9. As illustrated in FIG. 8 those parts of the system which are pertinent to applying the conveyor position error signals to the computer include the conveyor 15 driven by the motor 39 (not shown) a conveyor motion transducer 89, the error number which is made to appear on the output lines 112 from the overshoot monitor 91, the computer 113 which receives that number, and the positioning electonics 117 which translates the information produced by the computer 113 into signals usable by the laser head positioner 55. In following the operating sequence of the system through the steps illustrated in FIG. 9, the initial state of the system, prior to time T1, is that the conveyor assembly 15 is stationary and that material supported thereby within the cutting station 19 (FIG. 1) is being cut by the cutting head 51. The unit of material being cut is usually referred to as a "bite" and this portion of the system operation is labeled "cutting a 'bite'." At time T1 when the cutting operation is stopped, as represented by the change in level of the waveform 157, the conveyor advance is begun as shown by the beginning of the high level portion of the waveform 159. At the same time it is preferred that the position of the laser head 151 be brought to the point where the laser beam will be required when the next cutting operation is to begin. This is referred to as "dry hauling" the cutting beam to the first pattern in FIG. 9. The "dry hauling" operation is completed at time T2, this operation being shown by the waveform 161. The conveyor advance continues, however, until time T3, shown at the trailing end of the waveform 159. With the conveyor 15 brought to a stop at time T3, the conveyor overshoot information becomes available on line 112 and is applied to the computer until time T4, as shown by the waveform 163. When the overshoot information has been properly registered in the computer 113, at time T4 the position of the laser head 51 and hence of the laser cutting beam may be corrected along the X axis, this being performed during the time period T4–T5 as represented by the waveform 165 in FIG. 9. At time T5, with the laser head position corrected, the next cutting operation may begin, as shown by the second high level portion of the top waveform 157.

The steps which are performed by the computer 113 during the period T3–T4 relate to storing the conveyor overshoot information and are shown by a short computer program sub-routine 167 in FIG. 10. The additional computer operations which are performed during the period T4–T5 and which relate to applying the overshoot information toward correcting the position of the cutting head 51 are shown as a second computer program sub-routine 169 in FIG. 11. During the "conveyor complete" sub-routine 167 the first step 171 performed by the computer is to receive from appropriate monitoring devices associated with the conveyor a signal indicating the status of the conveyor's advancement. If the received signal represents an unsatisfactory advancement by the conveyor 15 the computer makes a decision, represented by the "advance ok?" block 173, to abort the subsequent steps of the routine and to initiate an alternative sequence such as the actuation of an alarm to indicate malfunctioning of the system. If, on the other hand, the received signal indicates that the conveyor advanced properly, the computer makes the decision to proceed to the next step of the program which is to isolate the conveyor overshoot value from other information which it is receiving at the same time, this being represented by the block 175.

With respect to the isolation of the overshoot value of the conveyor, it should be understood that at a given instant the computer 113 may receive several bits of information in addition to those appearing on the input lines 112 thereto. Isolation of the overshoot value is simply a conventional computer step whereby the total information received is shifted in a register until the desired bits of information, in this case conveyor overshoot value, are located in the position from which they may then be transferred to another part of the computer for further processing. This indeed is the next stop, represented by the block 177 in FIG. 10, and encompasses the storing of the isolated overshoot value in a particular designated portion of the omputer's memory labeled "correct." There it remains until the ocmputer is instructed to apply the stored overshoot value to correct the position of the cutting head 51. At some time after the execution of the "conveyor complete" sub-routine 167, the computer 113 will be instructed to implement the next relevant sub-routine illustrated in FIG. 11. The first step in this sequence, represented by the block 179 is to obtain the overshoot value from the memory cell location "correct" and to apply that value during the step represented by the block 181 to the positioning electronics 117, causing it to direct the cutting head positioning motor 55 to move the cutting head 51 along the X axis by an amount equal to the distance signalled on the line 112.

The foregoing computational sequence is based on the assumption that after the laser beam has been traversed through its desired route, the cutting head positioner 55 is brought to a starting position which is fixed relative to the predetermined stepping positions P1, P2, etc., of the conveyor, thus wiping out the compensating move which had been made by the positioner 55. Alternatively, however, the positioner 55 may be left at the point which it reached at the end of the cutting operation. In that case, it would be moved during the next cutting operation, after the next advancement of the conveyor, from that terminal point as its new starting point. As a result, the compensating movement which it executed during the previous cutting operation would remain and after the next advancement of the conveyor no further correction would be necessary if the magnitude of the conveyor overshoot were the same. To take care of variations in conveyor overshoot, the overshoot count after each conveyor advance would be compared with the previous such count. The net difference between the two would then be applied to the positioning device. That is, if the current overshoot is greater than the previous overshoot the positioner 55 is advanced by the difference. If the opposite is true, the positioner is moved backward along the X axis, again by the difference.

The cutting operations which are carried out by the system shown in FIG. 6 and which begin at time T5 (FIG. 9) is executed preferably in accordance with a series of instructions which are stored on magnetic tape and which are entered into the computer for processing. In response to the series of instructions stored on the input tape the computer 113 generates a series of digital command signals representative of movements which are to be executed by the cutting head 51 both transversely to and parallel the axis along which the conveyor 15 moves. The digital command signals generated by the computer 113 may be example be a series of absolute points along the X and Y axis relative to some stationary reference point, with the positioning electronics 117 being operative to cause the laser head positioning motors 55 and 75 to execute the appropriate movements in succession along the X axis and the Y axis respectively. Typically the positioning electronics includes standard linear interpolating circuits whereby the successive position commands along the X and Y axes are converted into X and Y axis pulse trains whose frequencies are in the proportion required to cause the resultant tool movement to be along the desired direction to reach the commanded position. It will also be understood that the motors 55 and 75 will typically be servomechanisms which include, in addition to motors for driving the lead screws, feedback signal generating devices such as resolvers, and electronic pulse registers, all connected together so that for each pulse received by the servomechanism it moves the lead screw by a predetermined amount, such as 0.001 inches. This type of digital servomechanism is standard equipment in present day numerically controlled machine tools and is for that reason not shown in greater detail herein.

By virtue of the programs 167 and 169 (FIGS. 10 and 11) stored therein, the computer 113 together with the positioning electronics 117 is operative to modify the position of the cutting head 51 from that represented by the digital command signals by the amount being signalled by the digital counter 111 when the conveyor 15 has stopped. The manner in which this modification is carried out need not always be the same. Thus, if desired it may be carried out as has been described herein, by an initial movement of the cutting head 51 along the X axis by an amount corresponding to the signalled conveyor position error along the X axis. Once this physical movement of the cutting head 51 has been carried out, all subsequent movements of the laser head will be offset by the proper amount so that there is no need for further correction until the next advancement of the conveyor. Alternatively, however, rather than to move the cutting head 51 during a separate step, the commanded positions of the laser head along the X axis may each be modified within the computer through a computational step so that each absolute position commanded for the cutting head 51 along the X axis is modified individually.

In conclusion it is believed clear from the foregoing that what has been described represents a significant advancement in the art of positioning devices, particularly where a work support surface is advanced past a tool in a series of substantially equal increments and wherein the tool is more easily positionable precisely than the work support surface. It will also be apparent that whereas this description has for sake of illustration concentrated on a laser cutter of a particular design, the principles of the present invention are not necessarily limited to that type of cutting tool. Moreover, while the use of a computer to execute the necessary position correction for the tool relative to the movable support surface is desirable in the type of system illustrated in FIG. 5, since the computer is required for other functions, the error correction may be performed by special purpose circuits which may be preferable where the computer is not required to perform other duties in the system.

What is claimed is:

1. In a material cutting system the combination of:
   a. a work support surface movable along a given axis;
   b. means for advancing said work support surface along said axis toward a predetermined work position;
   c. means for always stopping said work support surface at an actual position an indeterminate distance past said work position;
   d. means for producing an electrical signal digitally representative of the distance from said predetermined work position to said actual position;
   e. a cutting device adjacent said work support surface and means for moving said cutting device along said axis to a series of selected cutting positions; and
   f. means responsive to said electrical signal for automatically changing said cutting positions of said cutting device along said axis so as to compensate for said distance.

2. In a material cutting system the combination of:
   a. a work support surface movable along a given axis;

b. means for advancing said work support surface along said axis toward a predetermined work position;

c. means for stopping said work support surface at an actual position near said work position;

d. shortfall detecting means for determining whether or not said actual position is short of said work position;

e. means responsive to said shortfall detecting means for advancing said cutting surface beyond said work position;

f. means for producing an electrical signal digitally representative of the distance from said predetermined work position to said actual position;

g. a cutting device adjacent said work support surface and means for moving said cutting device along said axis to a series of selected cutting positions; and h. means responsive to said electrical signal for automatically changing said cutting positions of said cutting device along said axis so as to compensate for said distance.

3. A positioning system comprising in combination:

a. a work support surface movable along a given axis;

b. a tool movable along said axis relative to said work support surface;

c. means for generating digital command signals representative of movements to be executed by said tool along said axis relative to said surface;

d. means for moving said tool along said axis in response to said digital command signals;

e. means for progressively advacing said work support surface along said axis, each time by substantially a predetermined amount;

f. means for generating a pulse train representative of the distance travelled by said work support surface;

g. a digital counter for receiving said pulses and digitally signalling said distance;

h. means for resetting said counter each time it has received a number of pulses corresponding exactly to said predetermined amount;

i. means responsive to the output of said digital counter for stopping said movable work surface after it has advanced substantially by said predetermined amount; and j. means responsive to the contents of said digital counter for modifying, after each given stopping of said work support surface, the position of said tool from that represented by said digital command signals by the net difference between:

1. The amount being signalled by said digital counter after said given stopping of said work support surface, and 2. the amount signaled by said digital counter after the immediately preceding stopping of said work support surface.

4. A positioning system comprising in combination:

a. a work support surface movable along a given axis;

b. a tool movable along said axis relative to said work support surface;

c. means for traversing said tool after each advancement of said work support surface through successive points predetermined relative to a stationary reference point;

d. means for successively advancing said work support surface along said axis substantially to respective ones of a series of equally spaced work positions, said means including:

1. a digital counter;

2. means for advancing said counter in step with the advancement of said work support surface; and 3. means for resetting said counter after each advancement of said work support surface by said predetermined amount; and e. means responsive to the contents of said counter for offsetting each of said predetermined points after each given advancement of said work support surface by the net difference between:

1. the actual work position of said work support surface at the end of said given advancement, less the predetermined work position of said work support surface at the end of said given advancement, and 2. the actual work position of said work support surface at the end of the advancement immediately preceding said given advancement, less the predetermined work position of said work support surface for said immediately preceding advancement.

* * * * *